United States Patent
Durschang et al.

(10) Patent No.: US 12,492,141 B2
(45) Date of Patent: Dec. 9, 2025

(54) SPINEL GLASS-CERAMIC, METHOD FOR THE PRODUCTION THEREOF AND SHAPED DENTAL PRODUCT CONTAINING THE SPINEL GLASS-CERAMIC

(71) Applicant: Fraunhofer-Gesellschaft zur Förderung der angewandten Forschung e.V., Munich (DE)

(72) Inventors: Bernhard Durschang, Würzburg (DE); Jörn Probst, Würzburg (DE); Ferdinand Somorowsky, Würzburg (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 794 days.

(21) Appl. No.: 17/753,947

(22) PCT Filed: Sep. 18, 2020

(86) PCT No.: PCT/EP2020/076188
§ 371 (c)(1),
(2) Date: Mar. 18, 2022

(87) PCT Pub. No.: WO2021/053195
PCT Pub. Date: Mar. 25, 2021

(65) Prior Publication Data
US 2022/0324750 A1  Oct. 13, 2022

(30) Foreign Application Priority Data
Sep. 19, 2019  (DE) .................... 10 2019 214 284.2

(51) Int. Cl.
| | |
|---|---|
| C03C 10/00 | (2006.01) |
| A61C 13/083 | (2006.01) |
| A61K 6/833 | (2020.01) |
| C03B 32/02 | (2006.01) |
| C03C 1/04 | (2006.01) |
| C03C 4/00 | (2006.01) |

(52) U.S. Cl.
CPC ........ *C03C 10/0045* (2013.01); *A61C 13/083* (2013.01); *A61K 6/833* (2020.01); *C03B 32/02* (2013.01); *C03C 1/04* (2013.01); *C03C 4/0021* (2013.01); *C03C 10/0054* (2013.01); *C03C 2204/00* (2013.01)

(58) Field of Classification Search
CPC ........ C03B 32/02; A61K 6/833; A61C 13/083
See application file for complete search history.

(56) References Cited

U.S. PATENT DOCUMENTS

| | | |
|---|---|---|
| 7,846,857 B2 | 12/2010 | Hoeland et al. |
| 9,873,631 B2 | 1/2018 | Amin et al. |
| 2016/0051451 A1 | 2/2016 | Durschang et al. |
| 2017/0267575 A1 | 9/2017 | Borczuch-laczka et al. |

FOREIGN PATENT DOCUMENTS

| | | | |
|---|---|---|---|
| CN | 109809696 | * | 5/2019 |
| DE | 10245234 A1 | | 4/2004 |
| EP | 1688397 A1 | | 8/2006 |
| EP | 2723303 A1 | | 4/2014 |
| WO | WO-2014161770 A1 | | 10/2014 |

OTHER PUBLICATIONS

Katzschmann, Axel, "Der Einfluß von P2O5 auf die Struktur und Eigenschaften von Gläsern und Glaskeramiken des Systems MgO—Al2O3—SiO2", (Dissertation) Friedrich-Schiller-Universität Jena. Deutschland Autor: Axel Katzschmann XP nr:{055511553}paragraph [4.7.1]; examples P12. P15; tables 4.1. 4.6, (May 14, 1996), 118 pgs.
"German Application Serial No. 10 2019 214 284.2, Office Action dated Jun. 18, 2020", w/ Concise Statement of Relevance, (Jun. 18, 2020), 7 pgs.
"International Application Serial No. PCT/EP2020/076188, International Search Report dated Nov. 25, 2020", w/ English Translation, (Nov. 25, 2020), 5 pgs.
"International Application Serial No. PCT EP2020 076188, Written Opinion dated Nov. 25, 2020", w English Translation, (Nov. 25, 2020), 10 pgs.

* cited by examiner

*Primary Examiner* — C Melissa Koslow
(74) *Attorney, Agent, or Firm* — Schwegman Lundberg & Woessner, P.A.

(57) ABSTRACT

The present invention relates to a spinel glass-ceramic made from a composition with the components 25 to 50% by weight $SiO_2$, 10 to 35% by weight $Al_2O_3$, 1 to 15% by weight MgO, 1 to 15% by weight $P_2O_5$, 1 to 25% by weight $ZrO_2$ and/or $TiO_2$, 0 to 20% by weight $La_2O_3$, 0 to 10% by weight $B_2O_3$, and 0 to 15% by weight additives. The spinel glass-ceramic contains at least one spinel phase, but no high quartz solid solution phase. The glass-ceramic according to the invention exhibits very high mechanical stability, for example, very high flexural strength, wherein its optical properties can be simultaneously adjusted. In addition, the present invention also relates to a method for producing and the use of the spinel glass-ceramic. Furthermore, the present invention relates to a shaped dental product containing the spinel glass-ceramic.

18 Claims, No Drawings

SPINEL GLASS-CERAMIC, METHOD FOR THE PRODUCTION THEREOF AND SHAPED DENTAL PRODUCT CONTAINING THE SPINEL GLASS-CERAMIC

PRIORITY APPLICATIONS

This application is a U.S. National Stage Filing under 35 U.S.C. § 371 from International Application No. PCT/EP2020/076188, filed on Sep. 18, 2020, and published as WO2021/053195 on Mar. 25, 2021, which claims the benefit of priority to German Application No. 10 2019 214 284.2, filed on Sep. 19, 2019; the benefit of priority of each of which is hereby claimed herein, and which applications and publication are hereby incorporated herein by reference in their entireties.

The present invention relates to a spinel glass-ceramic made from a composition with the components 25 to 50% by weight $SiO_2$, 10 to 35% by weight $Al_2O_3$, 1 to 15% by weight MgO, 1 to 15% by weight $P_2O_5$, 1 to 25% by weight $ZrO_2$ and/or $TiO_2$, 0 to 20% by weight $La_2O_3$, 0 to 10% by weight $B_2O_3$, and 0 to 15% by weight additives. The spinel glass-ceramic contains at least one spinel phase, but no high quartz solid solution phase. The glass-ceramic according to the invention exhibits very high mechanical stability, for example, very high flexural strength, wherein its optical properties can be simultaneously adjusted. In addition, the present invention also relates to a method for producing and the use of the spinel glass-ceramic. Furthermore, the present invention relates to a shaped dental product containing the spinel glass-ceramic.

High-strength glass-ceramics are of diverse interest. In the dental field in particular, high-strength, translucent glass-ceramics are required for larger restorations, such as three- or multi-unit bridges in the molar area. The glass-ceramics on the market having the highest flexural values come from the lithium silicate system. Such glass-ceramics are described, for example, in EP 1 688 397, US 2017/267575 or EP 2 723 303 and exhibit maximum flexural strengths of up to 400 MPa (3-point flexural strength according to DIN EN ISO 6872).

In addition, glass-ceramics made from the high quartz solid solution system are known from the prior art. However, said glass-ceramics, described, for example, in US 2016/0051451 A1, have not become established since they cannot compete with the lithium silicate glass-ceramics on the market in terms of the combination of optics/translucency and mechanical properties.

For applications, in particular dental applications, in which flexural strengths of more than 400 MPa are required, there has hitherto been no viable solution from the glass-ceramic field. Instead, sinterable nano zirconium oxide ceramics are used, for example, in the dental field, which, however, are not comparable to glass-ceramics, in particular in terms of optical properties.

Proceeding therefrom, it was the object of the present invention to specify a glass-ceramic which exhibits very high mechanical stability, in particular very high flexural strength, and simultaneously advantageous optical properties.

According to the invention, a spinel glass-ceramic made of a composition with the following components is thus specified:
  25 to 50% by weight $SiO_2$,
  10 to 35% by weight $Al_2O_3$,
  1 to 15% by weight MgO,
  1 to 15% by weight $P_2O_5$,
  1 to 25% by weight $ZrO_2$ and/or $TiO_2$,
  0 to 20% by weight $La_2O_3$,
  0 to 10% by weight $B_2O_3$, and
  0 to 15% by weight of additives,
the proportions of the components adding up to 100% by weight.

According to the invention, a spinel glass-ceramic is understood to mean a glass-ceramic containing at least one spinel phase (or spinel crystal phase).

Spinel is preferably understood to mean magnesium spinel (for example, having the composition $MgAl_2O_4$). More preferably, the spinel is a magnesium-aluminum spinel, for example, having the composition $MgAl_{(2+x)}O_{(4+1,5x)}$, wherein x is a number from 0 to 1.

The spinel glass-ceramic according to the invention does not contain any high quartz solid solution phase.

The glass-ceramic according to the invention is distinguished by its special composition. Due to said composition and the special production of the glass-ceramic via a two-stage heat treatment, the glass-ceramic contains at least one spinel crystal phase, but no high quartz solid solution phase. Due to the presence of said spinel crystal phase, the glass-ceramic exhibits a very high mechanical strength and can thus also be used in applications that require particularly high mechanical strength. For example, flexural strengths of more than 400 MPa (measured according to DIN EN ISO 6872) can be achieved with the glass-ceramic according to the invention when it is produced in small batches. The system thus has enormous potential for homogeneous production in larger batches, since experience has shown that the strength can increase by around 100 MPa here.

In addition, the glass-ceramic according to the invention exhibits particularly advantageous optical properties. The optical properties of the glass-ceramic can thus be adjusted from highly translucent to opaque. In other words, the spinel glass-ceramic according to the invention can be obtained both as a highly translucent glass-ceramic and as an opaque glass-ceramic, but also in many intermediate stages.

A preferred embodiment of the spinel glass-ceramic according to the invention is characterized in that the spinel glass-ceramic consists of a composition with the following components:
  30 to 45% by weight, preferably 33.5 to 45% by weight, particularly preferably 35 to 40% by weight $SiO_2$,
  15 to 30% by weight, preferably 20 to 25% by weight $Al_2O_3$,
  3 to 10% by weight, preferably 5 to 8% by weight MgO,
  2 to 10% by weight, preferably 3 to 8% by weight $P_2O_5$,
  8 to 20% by weight, preferably 12 to 18% by weight $ZrO_2$ and/or $TiO_2$,
  0.1 to 15% by weight, preferably 8 to 12% by weight $La_2O_3$,
  0.1 to 5.0% by weight, preferably 1.0 to 2.0% by weight $B_2O_3$, and
  0.1 to 10.0% by weight, preferably 1.0 to 8.0% by weight additives.

The composition of the spinel glass-ceramic preferably contains 33.5 to 50% by weight, particularly preferably 34.0 to 50% by weight, very particularly preferably 34.5 to 50% by weight, in particular 35.0 to 50% by weight $SiO_2$.

The composition of the spinel glass-ceramic preferably contains both 1 to 15% by weight $P_2O_5$ and 0.1 to 20% by weight $La_2O_3$. The spinel glass-ceramic can contain spinel and lanthanum phosphate. The spinel glass-ceramic preferably contains no monazite.

A further preferred embodiment of the spinel glass-ceramic according to the invention is characterized in that the spinel glass-ceramic has spinel as the main crystal phase. The glass-ceramic according to the invention can thus preferably have a spinel phase as the main crystal phase. A "main crystal phase" is preferably understood to mean the crystal phase of the glass-ceramic having the highest mass fraction of all the crystal phases present in the glass-ceramic. Alternatively, the glass-ceramic can also have a plurality of (for example, two) main crystal phases, wherein said main crystal phases then have higher mass fractions than the further crystal phases present in the glass-ceramic. In this case, the glass-ceramic can have a second main crystal phase, for example, in addition to spinel as the main crystal phase.

The proportion of the spinel main crystal phase in all crystal phases present in the spinel glass-ceramic is preferably at least 30% by weight, particularly preferably at least 50% by weight, and more preferably at least 70% by weight.

In addition to spinel, the glass-ceramic according to the invention can also have one or more further crystal phases. The spinel glass-ceramic according to the invention preferably has a lanthanum phosphate crystal phase. The glass-ceramic has a particularly high mechanical strength due to the presence of both a spinel phase (or spinel crystal phase) and a lanthanum phosphate crystal phase in the glass-ceramic.

In a further preferred embodiment of the spinel glass-ceramic according to the invention, the additives are selected from the group consisting of fluorine, sodium oxide, barium oxide, strontium oxide, zinc oxide, calcium oxide, yttrium oxide, niobium oxide, tantalum oxide, nucleating agents, in particular tin oxide and/or precious metals, fluorescent agents, dyes, auxiliaries, and mixtures thereof.

It is preferred that the fluorescent agents are selected from the group consisting of oxides of neodymium, praseodymium, samarium, europium, terbium, dysprosium, holmium, erbium, and mixtures thereof.

Furthermore, it is preferred that the dyes are selected from the group consisting of
- glass-coloring oxides, preferably oxides of iron, titanium, cerium, copper, chromium, cobalt, nickel, manganese, selenium, silver, indium, gold and oxides of rare earth metals
- color bodies, preferably doped spinels, and
- mixtures thereof.

A further preferred embodiment of the spinel glass-ceramic according to the invention is characterized in that the spinel glass-ceramic manifests a flexural strength, measured according to DIN EN ISO 6872, of more than 400 MPa, preferably more than 500 MPa.

The present invention also relates to a method for producing the spinel glass-ceramic according to the invention in which
a) a starting glass containing the components of the spinel glass-ceramic is produced,
b) the starting glass is subjected to at least one first heat treatment and then at least one second heat treatment.

In a preferred variant of the method according to the invention, the at least one first heat treatment takes place at a temperature of 700° C. to 950° C., preferably from 800° C. to 900° C., and/or over a period of 15 min to 360 min, preferably from 120 min to 240 min.

Furthermore, it is preferred that the at least one second heat treatment takes place at a temperature of 900° C. to 1200° C., preferably from 950° C. to 1000° C., and/or over a period of 5 min to 200 min, preferably 60 min up to 120 min.

In addition, the present invention relates to the use of the spinel glass-ceramic according to the invention as a dental material, as a component of a dental material or as a high-strength substrate for components, in particular electronic components. For example, the spinel glass-ceramic according to the invention can be used in a molar bridge.

The present invention further relates to a shaped dental product containing a spinel glass-ceramic according to the invention, in particular in the form of an inlay, an onlay, a bridge, for example, a molar bridge, a post structure, a facing, a crown or a partial crown.

The present invention will be explained in more detail on the basis of the following examples, without restricting it to the specific embodiments and parameters shown here.

EMBODIMENTS

In a first embodiment, a starting glass having the following composition is first produced:
38.25% by weight $SiO_2$,
22.15% by weight $Al_2O_3$,
6.51% by weight MgO,
7.06% by weight $P_2O_5$,
7.66% by weight $ZrO_2$,
4.97% by weight $TiO_2$,
11.75% by weight $La_2O_3$,
1.64% by weight $B_2O_3$.

The starting glass is subjected to a first heat treatment, which takes place at a temperature of 900° C. and for a period of 2 hours, and is then subjected to a second heat treatment, which takes place at a temperature of 1000° C. and for a period of 2 hours.

A spinel glass-ceramic according to the invention is obtained, having a maximum flexural strength of 546 MPa measured according to DIN EN ISO 6872. By examining the glass-ceramic produced by means of X-ray diffractometry and TEM, it was found that said glass-ceramic contains a spinel phase (or spinel crystal phase) and a lanthanum phosphate crystal phase but no high quartz solid solution phase.

In a second embodiment, a starting glass having the following composition is first produced:
35.01% by weight $SiO_2$,
23.80% by weight $Al_2O_3$,
5.23% by weight MgO,
3.26% by weight $P_2O_5$,
8.83% by weight $ZrO_2$,
6.76% by weight $TiO_2$,
11.24% by weight $La_2O_3$,
1.57% by weight $B_2O_3$,
1.80% by weight $CeO_2$,
2.00% by weight $Y_2O_3$,
0.50% by weight $Tb_5O_{11}$.

The starting glass is subjected to a first heat treatment, which takes place at a temperature of 800° C. and for a period of 4 hours, and is then subjected to a second heat treatment, which takes place at a temperature of 985° C. and for a period of 1 hour.

A spinel glass-ceramic according to the invention is obtained, having a maximum flexural strength of 433 MPa measured according to DIN EN ISO 6872. By examining the glass-ceramic produced by means of X-ray diffractometry and TEM, it was found that said glass-ceramic contains a spinel phase (or spinel crystal phase) and a lanthanum phosphate crystal phase but no high quartz solid solution phase.

The invention claimed is:

1. A spinel glass-ceramic composed of a composition with the following components:
   30 to 45% by weight $SiO_2$,
   15 to 30% by weight $Al_2O_3$,
   3 to 10% by weight MgO,
   2 to 10% by weight $P_2O_5$,
   8 to 20% by weight $ZrO_2$ and/or $TiO_2$,
   0.1 to 15% by weight $La_2O_3$,
   0.1 to 3.0% by weight $B_2O_3$, and
   0.1 to 10.0% by weight of additives, the proportions of the components adding up to 100% by weight, and the spinel glass-ceramic not containing any high quartz solid solution phase.

2. The spinel glass-ceramic according to claim 1, composed of a composition with the following components:
   35 to 40% by weight $SiO_2$,
   20 to 25% by weight $Al_2O_3$,
   5 to 8% by weight MgO,
   3 to 8% by weight $P_2O_5$,
   12 to 18% by weight $ZrO_2$ and/or $TiO_2$,
   8 to 12% by weight $La_2O_3$,
   1.0 to 2.0% by weight $B_2O_3$, and
   1.0 to 8.0% by weight additives.

3. The spinel glass-ceramic according to claim 1, wherein the spinel glass-ceramic has spinel as the main crystal phase, wherein the proportion of the spinel main crystal phase in all crystal phases present in the spinel glass ceramic is at least 30% by weight.

4. The spinel glass-ceramic according to claim 3, wherein the proportion of the spinel main crystal phase in all crystal phases present in the spinet glass ceramic is at least 50% by weight.

5. The spinet glass-ceramic according to claim 3, wherein the proportion of the spinel main crystal phase in all crystal phases present in the spinel glass ceramic is at least 70% by weight.

6. The spinel glass-ceramic according to claim 1, wherein the additives are selected from the group consisting of fluorine, sodium oxide, barium oxide, strontium oxide, zinc oxide, calcium oxide, yttrium oxide, niobium oxide, tantalum oxide, nucleating agents, fluorescent agents, dyes, and mixtures thereof.

7. The spinel glass-ceramic according to claim 6, wherein the fluorescent agents are selected from the group consisting of oxides of neodymium, praseodymium, samarium, europium, terbium, dysprosium, holmium, erbium, and mixtures thereof.

8. The spinel glass-ceramic according to claim 6, wherein the dyes are selected from the group consisting of:
   glass-coloring oxides,
   color bodies, and
   mixtures thereof.

9. The spinet glass-ceramic according to claim 6, wherein the nucleating agents are selected from the group consisting of tin oxide and/or precious metals.

10. The spinet glass-ceramic according to claim 1, wherein the spinel glass-ceramic has a flexural strength, measured according to DIN EN ISO 6872, of more than 400 MPa.

11. The spinel glass-ceramic according to claim 10, wherein the spinel glass-ceramic has a flexural strength, measured according to DIN EN ISO 6872, of more than 500 MPa.

12. A method for producing a spinel glass-ceramic, the method comprising:
    a) producing a starting glass containing the components of the spinel glass-ceramic, the components including:
       30 to 45% by weight $SiO_2$,
       15 to 30% by weight $Al_2O_3$,
       3 to 10% by weight MgO,
       2 to 10% by weight $P_2O_5$,
       8 to 20% by weight $ZrO_2$ and/or $TiO_2$,
       0.1 to 15% by weight $La_2O_3$,
       0.1 to 3.0% by weight $B_2O_3$, and
       0.1 to 10.0% by weight of additives,
       the proportions of the components adding up to 100% by weight, and
       the spinel glass-ceramic not containing any high quartz solid solution phase; and
    b) subjecting the starting glass to at least one first heat treatment and then at least one second heat treatment wherein the at least one first heat treatment takes place at a temperature of 700° C. to 950° C. and wherein the at least one second heat treatment takes place at a temperature of 900° C. to 1200° C.

13. The method according to claim 12, wherein the at least one first heat treatment takes place over a period of 15 min to 360 min.

14. The method according to claim 12, wherein the at least one second heat treatment takes place over a period of 5 min to 200 min.

15. The spinel glass-ceramic according to claim 12, wherein the at least one first heat treatment takes place at a temperature of 800° C. to 900° C. and/or over a period of 120 min up to 240 min.

16. The spinel glass-ceramic according to claim 15, wherein the at least one second heat treatment takes place at a temperature of 950° C. to 1000° C., and/or a period of 60 min to 120 min.

17. The spinel glass-ceramic according to claim 12, wherein the at least one second heat treatment takes place at a temperature of 950° C. to 1000° C., and/or a period of 60 min to 120 min.

18. A shaped dental product containing a spinel glass-ceramic, the dental product including:
    a spinel glass-ceramic composed of a composition with the following components:
       30 to 45% by weight $SiO_2$,
       15 to 30% by weight $Al_2O_3$,
       3 to 10% by weight MgO,
       2 to 10% by weight $P_2O_5$,
       8 to 20% by weight $ZrO_2$ and/or $TiO_2$,
       0.1 to 15% by weight $La_2O_3$,
       0.1 to 3.0% by weight $B_2O_3$, and
       0.1 to 10.0% by weight of additives,
       the proportions of the components adding up to 100% by weight, and
       the spinel glass-ceramic not containing any high quartz solid solution phase.

* * * * *